Figure 1:
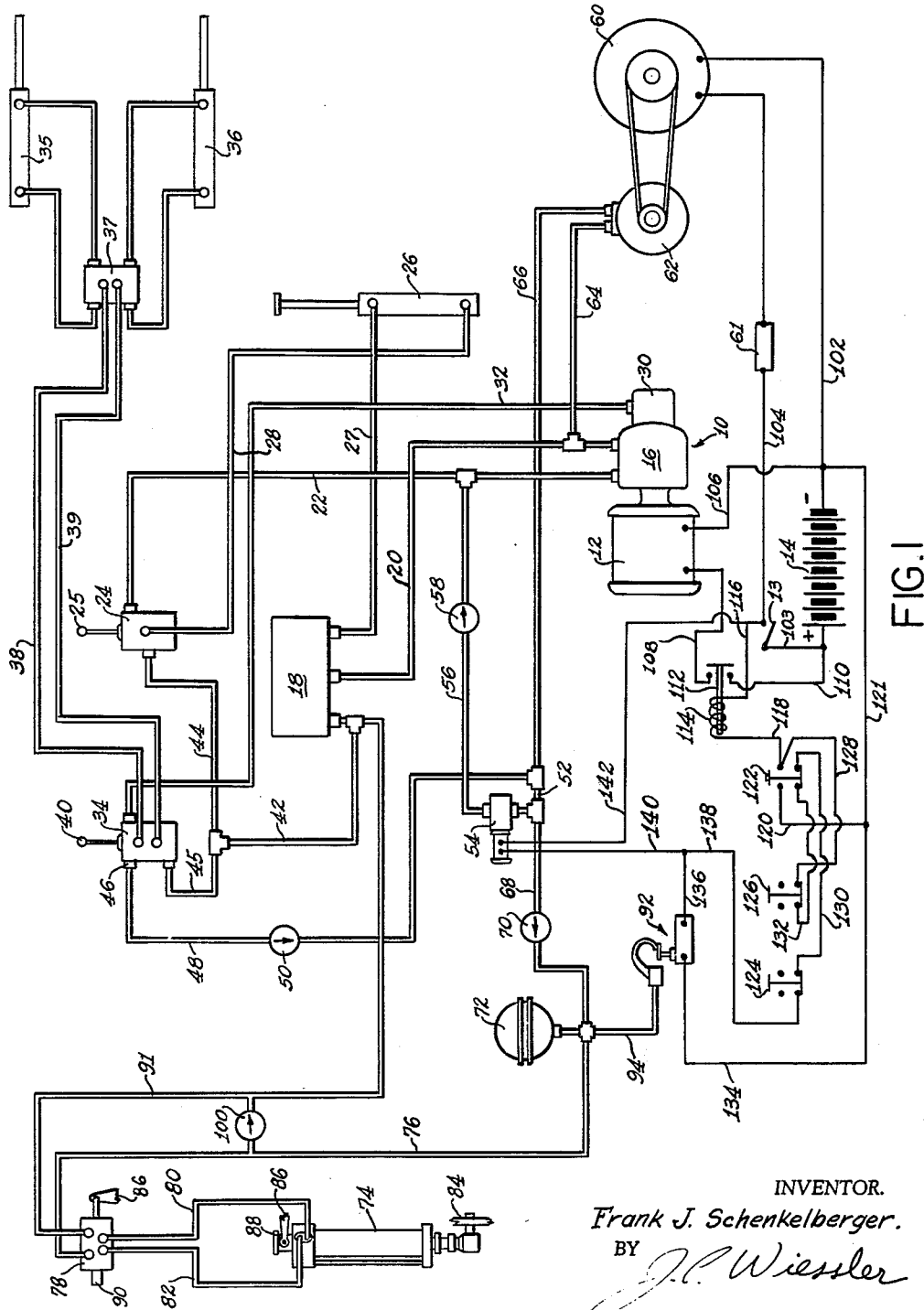

April 2, 1963   F. J. SCHENKELBERGER   3,083,533
HYDRAULIC SYSTEM
Filed Oct. 24, 1960   2 Sheets-Sheet 2

INVENTOR.
FRANK J. SCHENKELBERGER
BY
*P. F. Wiessler*
ATTORNEY 3,083,533
HYDRAULIC SYSTEM
Frank J. Schenkelberger, Battle Creek, Mich., assignor to Clark Equipment Company, a corporation of Michigan
Filed Oct. 24, 1960, Ser. No. 64,654
5 Claims. (Cl. 60—51)

This invention relates to hydraulic power transmission systems of the type having a plurality of fluid energy translating devices and more particularly to such a system for use in a vehicle. This application is a continuation-in-part of my co-pending application Serial No. 770,369, filed October 28, 1958, now abandoned.

It has been found that the present invention is particularly useful in connection with vehicles such, for example, as industrial lift trucks and the like, although other uses will undoubtedly appear to persons skilled in the art. My invention is described in detail hereinafter in conjunction with an exemplary use thereof in an electric motor driven industrial lift truck. As herein embodied, my invention is utilized to operate and control in an extremely efficient manner the load lifting motor, mast tilting motors, and steering booster motor of the truck. One embodiment of the invention includes a pressure storage accumulator in a power steering portion of the hydraulic system wherein a pair of pumps is provided, either of which is adapted to provide fluid energy to charge the accumulator, as well as to operate the other hydraulic motors, depending upon whether the vehicle or prime mover thereof is at rest or in motion. One of the aforementioned pumps is adapted to be driven directly by the prime mover of the vehicle whereas the other is adapted to be intermittently operated by the main pump motor only when the prime mover is stationary and the accumulator is charged at a pressure which is less than a predetermined minimum.

In some industrial lift trucks the prime mover has insufficient output to drive a pump connected thereto, as above, without overloading. In such cases it has been found desirable to provide a separate source of power, other than the prime mover, to drive this pump, and arrange the separate power source so that it will drive this pump whenever the vehicle is in use, whether at rest or in motion.

By providing in the hydraulic system a pump driven by the prime mover of the vehicle or driven by separate means which normally operates continuously, power for steering the vehicle is obtained with a minimum expenditure of battery capacity as compared with prior power steering systems which require that the main or steering pump motor be energized and kept running each time the truck is steered. This latter operation, of course, entails high starting current surges which are peculiar to pump motors and which, in practice, present a serious battery capacity problem. It is one of the important objects of the present invention to minimize this problem.

The aforementioned pump which normally operates intermittently from the storage battery will be energized for power steering purposes only during those rare instances when the accumulator pressure falls below a predetermined minimum due, for example, to a great deal of maneuvering, and also during such times as when the charge has been allowed to leak from the accumulator after prolonged periods of idleness of the vehicle. Prior systems not utilizing an accumulator and pumps as provided by the present invention, require that the main hydraulic pump motor or a steering pump motor, if provided, be energized each time the vehicle is steered. As a result, the high starting current surges peculiar to pump motors cause a serious battery capacity drain, particularly during periods of maneuvering.

An object of the present invention is to provide a power steering system for a vehicle wherein controlled and essentially uniform steering speeds are obtained in the use of pressure storage means which maintains predetermined pressure range in the system.

Another object of this invention is to provide in a hydraulic system for a vehicle, a plurality of fluid energy translating devices for providing fluid to a fluid motor, which fluid motor is supplied by fluid pressure storage means which is adapted to be charged by one of the energy translating devices when the vehicle is in motion and by another energy translating device when the vehicle is at rest.

A still further object of the invention is to provide a hydraulic system for a battery operated vehicle which supplies the fluid energy necessary for power steering the vehicle with relatively small expenditure of battery capacity.

It is still a further object of this invention to provide a hydraulic system for an electric storage battery operated vehicle which includes steering pump means which operates continuously when the vehicle is in use for supplying the fluid energy necessary for power steering with a relatively small expenditure of battery capacity.

A still further object is to provide a hydraulic system for a vehicle which is of an improved type, is simple and efficient in operation, and is rugged and dependable in service.

Figure 2:
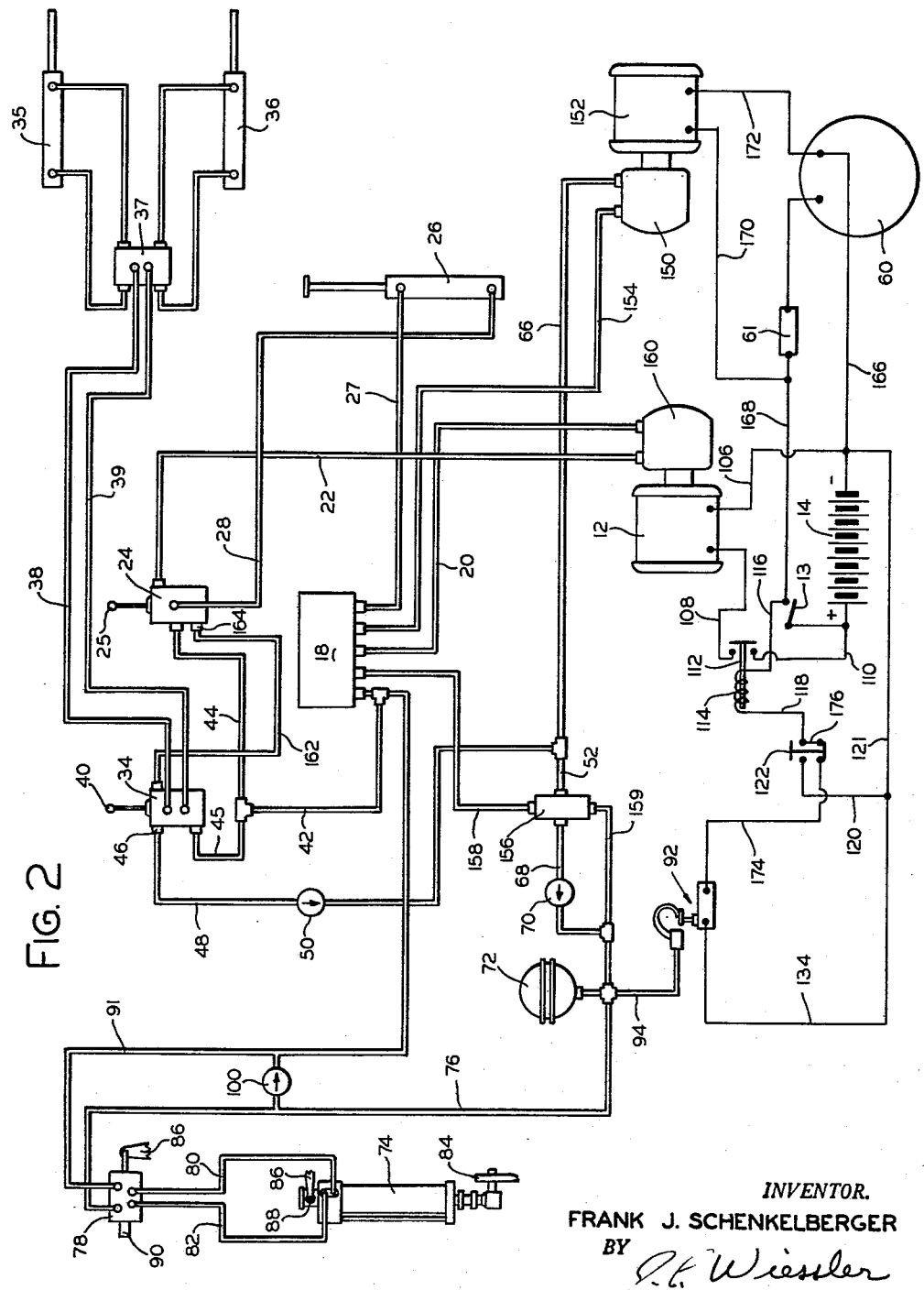

Further objects and advantages of the present invention will be apparent from the following description, reference being had to the accompanying drawings wherein:

FIGURE 1 is a somewhat schematic showing of the hydraulic and electrical components of a power transmission system for a vehicle which incorporates one form of the present invention; and FIGURE 2 is a somewhat schematic showing of a modification of the form of the invention as shown in FIG. 1.

Referring now to FIG. 1 of the drawing, the power transmission system is utilized to operate, in a manner to be described, a plurality of fluid motors such, for example, as might be found in a conventional fork lift truck wherein it is usual to provide hydraulic motors for elevating a fork carriage upon an upright mast, for tilting the mast and fork carriage to prevent, for example, the load thereon from becoming disengaged from the forks, and for providing power steering of the truck.

The system includes a dual pump unit 10 which is driven by a pump motor 12. The motor 12 is automatically energized in a manner to be presently described by suitable switch means which connects it in circuit with a conventional storage battery power supply 14. The dual pump unit 10 is utilized for providing pressure fluid to a main portion of the hydraulic system and includes a pumping element 16 which is adapted to draw fluid from a sump 18 through a conduit 20 and to supply fluid at a predetermined rate of flow through a conduit 22 to a control valve 24 which controls operation of a cylinder and piston assembly comprising a single acting fluid motor 26. The control valve 24 may be of a conventional manually operated simple spool type for selectively directing fluid under pressure through a conduit 28 to the fluid motor 26. In a specific application, motor 26 is used as the hydraulic lift for elevating the fork carriage of a lift truck, pumping element 16 being adapted to supply pressure fluid thereto at a rate of about 15 gallons per minute.

The dual pump unit 10 further includes a pumping element 30 which is also adapted to draw fluid from the sump 18 through the conduit 20 and to supply such fluid at a predetermined rate of flow (in the specific application above referred to, about 5 gallons per minute) through a conduit 32 to a second control valve 34 which controls the operation of a pair of cylinder and piston assemblies comprising a pair of double-acting fluid motors 35 and 36. A conventional tilt lock valve 37 is interposed between the latter fluid motors and the valve 34 for preventing cavitation in said motors, thereby insuring equal travel at all times of the pistons thereof, the fluid motors being connected in parallel to the tilt lock valve, as shown. The tilt lock valve 37 is connected to the control valve 34 by conduits 38 and 39; the valve 34 is of a conventional spool type for selectively supplying fluid under pressure to the fluid motors 35 and 36 by manipulation of control handle 40 to connect conduit 32 to either conduit 38 or 39, whereby to actuate the pistons for tilting the mast structure of the truck in either a forward or a reverse direction.

The pumping element 16 can be connected only to the fluid motor 26 through the control valve 24 or to the sump 18 through conduits 42 and 44. Valve 34 is also connected to the sump by conduits 42 and 45. The fluid motor 26 is also connected to the sump 18 by means of a suitable return line 27. The pumping element 30 is adapted to be selectively connected not only to fluid motors 35 and 36, as aforesaid, but also to the fluid motor 26, whereby the flow rates of both pumping elements 16 and 30 are combinable to operate motor 26. This is accomplished by connecting a by-pass or high pressure carry-over port 46 of the valve 34 to the conduit 22. When operation of the lift motor 26 alone is called for, a control handle 25 for valve 24 is manipulated to direct the output of pump element 16 through conduits 22 and 28. The output of pump element 30 by-passes valve 34 through port 46, from whence it flows to conduit 22 supplying lift motor 26 by way of a conduit 48, a one-way check valve 50, a conduit 52 through a normally open solenoid valve 54, and a conduit 56 having a one-way check valve 58 therein. With this arrangement, the total volume output of both pump elements 16 and 30 can be made available to operate the lift motor 26, but only the output of the smaller pumping element 30 can be made available to operate the tilt motors 36 and 35, which is desirable.

Referring now to the power steering portion of the system, the main drive motor or prime mover of the lift truck is designated at 60. The motor 60 is shown as a conventional type of electric motor which receives its motive power from the storage battery power supply 14. Interposed in the circuit between the battery and the prime mover is a conventional ignition switch 13 and a drive motor control means 61 which may be of a conventional type, or of the type disclosed in my co-pending U.S. application Serial No. 736,866, filed May 21, 1958, which covers improvements in a hydraulic control utilizing a carbon pile resistor. However, such control means forms no part of the present invention. The present invention, can, of course, be utilized in vehicles using internal combustion engines, although it has particular utility when used in electric power vehicles.

Connected to be driven by a belt and pulley from the main drive motor of the lift truck is a fluid pump 62 having an inlet conduit 64 and an outlet conduit 66. The inlet conduit 64 intersects the conduit 20 leading from the sump 18 thereby to supply fluid to the pump 62. The pump 62 is of a well-known type which is designed to permit flow therethrough in one direction only, irrespective of reversals in the direction of rotation of the input shaft thereof. Such reversals will frequently occur in operation since the electric motor 60 is reversible being connected to the drive wheels of the vehicle for either forward or reverse operation thereof. The pump 62 is preferably of the rotary piston type having check valves on the intake and discharge ends of each piston. Such a construction provides two unique characteristics which are important to the embodiment of FIG. 1 of the present invention. First of all, with this type of pump construction, the high pressure discharge side of the pump is isolated from its hydraulic circuit by the check valves in each piston when the pump is not rotating and, as above mentioned, maintains the same ports for discharge and intake regardless of its direction of rotation. A pump having the characteristics above mentioned and which is suitable for use in the system of the present invention is commercially available and is manufactured by Dynex, Inc., Milwaukee, Wis., under their Model Nos. PF-3003 and PF-3006.

With the above-mentioned arrangement, the conduit 66 is always a high pressure line, and the conduit 64 is always a low pressure line; thus, the pressure fluid always flows through conduit 66 which connects with the conduit 52 at its one end. The purpose in using this arrangement will appear later.

Conduit 52 is connected to the solenoid valve 54 and also to a conduit 68, in which is located a one-way check valve 70. Conduit 68 communicates with an hydraulic accumulator 72 of well-known type which stores pressure fluid for instantaneous use whenever the system, or certain components thereof, demand it. The accumulator also serves to smooth out pressure surges, provide sufficient fluid to compensate for loss due to leakage, and to prevent shock pressure developed in the system from damaging the circuit components, all of which functions are well-known with respect to accumulators.

In the present system, the accumulator 72 is the primary pressure fluid supply source for a steering booster cylinder assembly 74, to which it is connected by means of a conduit 76, a normally closed-center spool valve 78, and a pair of conduits 80 and 82. The booster cylinder assembly 74 is also of conventional well-known type one such, for example, as that manufactured by Vickers, Inc., and designated Model S23 Series steering booster; it is fixed to the frame of the lift truck at 84 and is connected to a steering spider 86 at 88, spider 86 being adapted to actuate the steering wheels through linkage, not shown. The normally closed-center spool valve 78 is connected by means of a suitable linkage, indicated in part at numeral 90, to the operator's steering wheel of the vehicle and also to steering spider 86 such that actuation of cylinder 74 causes follow-up movement of valve 78 through its connection to the steering spider 86.

The functioning of booster cylinder 74, spool valve 78, and associated parts is as follows: When the operator's steering wheel is turned, the linkage 90 is actuated to cause a movement of the operating rod of the normally closed-center spool valve 78, following which steering cylinder 74 is actuated by the application of fluid pressure through one of the conduits 80 or 82 to move spider 86 and thereby produce a movement of the steering wheels of the vehicle. Two positions of the valve 78 are provided for directing the flow of fluid against one or the other of the faces of a piston within cylinder 74 for steering the vehicle to the left or to the right. Pressure fluid will be supplied to the cylinder 74 at such times as the linkage 90 is being moved by the operator's steering wheel from a neutral position to the left or to the right and such pressure fluid will be interrupted upon cessation of such movement of the steering wheel. A suitable return conduit 91 is provided for returning fluid from one side of the cylinder 74 to the sump 18 when fluid under pressure is being applied to the other side thereof.

A hydraulic differential pressure switch, generally indicated at 92, is connected by suitable means such as a conduit 94 to the accumulator 72. The function of the pressure switch 92 is to act as a signal means for solenoid valve 54 and motor 12 in order to maintain the pressure of the operating fluid within the accumulator 72 within a predetermined range satisfactory for the efficient and reliable operation of the booster steering cylinder 74. Hydraulic differential pressure switches such as the switch 92 are well-known in the art. One such switch which is commercially available and which is suitable for use in the system of the invention is known as the Barksdale-Meletron Pressure Switch, Model 302. The pressure switch 92 is of the Bourdon tube type and has in practice, for example, been designed to assure a pressure of operating fluid within the accumulator 72 between a predetermined high pressure setting of 1,450 p.s.i., and a predetermined low pressure setting of 850 p.s.i. Thus, if the pressure within the accumulator 72 drops below 850 p.s.i., the electrical contacts of the pressure switch 92 will be closed to thereby establish a current flow through the solenoid of the solenoid valve 54. The solenoid valve 54 will thus be energized to a closed position which prevents communication between the conduits 52 and 56. At the same time, a closed circuit may be established through the main pump motor 12 to thereby cause pressure fluid to be supplied to the accumulator 72 to restore the pressure therein. Other conditions which must concur with a closing of switch 92 prior to energization of motor 12 will be discussed hereinafter. When the pressure in the accumulator 72 reaches 1,450 p.s.i., in the above example, the contacts of the pressure switch 92 will be opened and the circuit through the solenoid valve 54 and the pump motor 12 will be broken thereby de-energizing same. The aforementioned pressures are, of course, exemplary only and may be varied as desired in practice.

Normally, the accumulator 72 is charged by the pump 62 which draws fluid from the sump 18 and delivers it to the accumulator 72 through conduits 66, 52 and 68 and through the one-way check valve 70. If the accumulator 72 is charged at least to the low pressure setting of switch 92 (850 p.s.i. in the above example) the output of the pump 62 during operation of the vehicle will bypass the accumulator 72 through the normally open solenoid valve 54 and will thus deliver its output through the conduit 56 and check valve 58 into the output conduit 22 of the larger volume pumping element 16. Whenever the solenoid valve 54 is energized to a closed position by operation of the pressure switch 92, however, the output of the pump 62 will be delivered to the accumulator 72 as above described.

If the vehicle is stationary, that is, if the main drive motor 60 of the vehicle is not in operation, the accumulator 72 may be charged by the smaller volume pumping element 30 of the dual pump unit 10 in the manner described hereinabove; i.e., through the high pressure carry-over port 46 of the control valve 34 and circuitry connecting said port to the accumulator. Since the pump 62 is designed to provide only one-way flow, the flow from the pumping element 30 cannot return to the sump 18 through the pump 62.

A suitable pressure relief valve 100 is installed in the accumulator circuit between the conduits 76 and 91 to prevent over-charging of the accumulator 72 in the event of malfunction of the pressure switch 92. It will be observed that the check valve 70 in the conduit 68 will prevent discharge from the accumulator 72 to the sump 18 through the solenoid operated normally open valve 54. It should further be noted that the one-way check valve 50 in the conduit 48 will prevent the discharge of high pressure fluid from the pump 62 back to the sump 18 through the control valves 24 and 34 and the dual pump unit 10 of the main hydraulic circuit.

The electrical circuitry for controlling the various hydraulic components above described is as follows:

The electric storage battery power supply 14 is connected to one side of the main drive motor 60 by means of a conductor 102 and to the other side of such motor by way of a conductor 103 and a conductor 104. Interposed in the conductor 104 is the conventional ignition switch 13, and the motor regulator 61.

The pump motor 12 is connected at one side thereof to the power supply 14 by means of a conductor 106 and at the other side thereof by means of conductors 108 and 110. The conductors 108 and 110 are normally in open circuit relationship and are adapted to be electrically closed by the armature 112 of a coil 114 when such coil is energized. The coil 114 is connected at one side thereof to the power supply 14 through a conductor 116 and the conductor 103 when the ignition switch 13 is closed. The opposite side of the coil 114 is connected to the power supply 14 by means of a conductor 118, a conductor 120 and a conductor 121. The conductors 118 and 120 are also normally in open circuit relationship and are adapted to be electrically closed by the operation of a manually operated interlock switch 122. The interlock switch 122 is suitably connected, by any convenient means, for actuation to complete the circuit between conduits 118 and 120 whenever either of the operating handles 25 or 40 of the valves 24 and 34, respectively, are manually moved to one of their operating positions.

The interlock switch 122 is connected in series with a pair of forward and reverse interlock switches 124 and 126, respectively, by means of conductors 128, 130 and 132. The forward and reverse interlock switches 124 and 126 are connected in a manner well known in the art for actuation by manually operable selection means included in control 61 of the main drive motor 60 in accordance with the operation of such motor in either a forward or reverse direction.

The differential pressure switch 92 is connected at one side thereof with the power supply 14 by means of a conductor 134 and the conductor 121. Connected to the opposite side of the pressure switch 92 is a conductor 136 which is joined to a pair of conductors 138 and 140. The conductor 138 is connected to the interlock switch 124 and the conductor 140 is connected to one side of the solenoid of the solenoid operated valve 54. The opposite side of the solenoid is connected to the power supply 14 by means of a conductor 142, ignition switch 13, and the conductor 103.

In view of the above-described arrangement it may readily be seen that the electrical circuitry is so established as to provide for an interlocked operation of certain of the electrical components only when certain conditions prevail within the hydraulic circuit coupled with certain other conditions prevailing in the electrical circuit.

The interlock switch 122 performs an important function as should now be apparent such that the pump motor 12 may be energized to supply fluid to either of the hydraulic motors 26, 35 or 36, or to the accumulator 72, when certain conditions prevail as follows:

(1) During such times as the main drive motor 60 is at rest and the ignition switch 13 is closed, the pump motor 12 may be energized to cause the pumping elements 16 and 30 to provide fluid under pressure for operation of either of the hydraulic motors 26, 35 and 36 by manipulation of either of the operating handles 25 or 40 of the control valves 24 and 34, respectively, as desired. The manipulation of either of the control handles 25 or 40 as above mentioned will result in the interlock switch 122 closing the circuit through the coil 114 as described above. At the same time, if the pressure switch 92 is actuated by a drop in pressure in the accumulator 72 below the predetermined low pressure setting thereof, the accumulator 72 will also be charged by energization of the pump motor 12 through the high pressure carry-over port 46 of valve 34, in the manner previously described for this operation. Further, when the main drive motor 60 is at rest and ignition switch 13 is closed, the forward and reverse interlocks 124 and 126 will be in a closed circuit condition with respect to the pump motor 12, as shown in the drawing and explained hereinabove. Consequently, a pressure drop in accumulator 72 which results in switch 92 closing will complete the circuit through interlock switches 124 and 126 to energize pump motor 12 and drive pumps 16 and 30 to charge accumulator 72.

(2) When the main drive motor 60 is energized one of the interlocks 124 or 126 will be opened in the circuit of motor 12. Under this condition only the main pump 62 will be utilized to supply fluid under pressure to charge the accumulator 72, unless interlock switch 122 is closed due to actuation of control handles 25 or 40, in which case pumps 16 and 30 also will provide fluid for charging accumulator 72. When the accumulator is fully charged with the vehicle in motion the pressure fluid from pump 62 will by-pass the accumulator circuit through the normally open solenoid valve 54 and may be utilized for operation of the hydraulic lift cylinder 26 by manipulation of the operating handle 25 of the control valve 24 in the manner previously described.

Having now described the structure and operation of the essential elements of the hydraulic and electrical systems of the present invention as shown in FIGURE 1, it is believed that a better understanding of the novel aspects thereof will be had by describing the operation thereof under various conditions of operation of a lift truck vehicle.

Let it be assumed that a lift truck is being maneuvered into position to engage a load upon the forks thereof. In view of the fact that the vehicle is moving under the power of the motor 60, the ignition switch 13 will be closed and the pump 62 will be running and will supply fluid under pressure to the accumulator 72 until the pressure therein reaches the high pressure setting thereof as set by the differential pressure switch 92. When such pressure is attained, the solenoid operated valve 54 will be de-energized to establish the normally open flow communication between the conduits 66, 52 and 56 to thereby divert the flow from the pump 62 to the main hydraulic circuit through the conduit 22. At this time, the interlock switch 122 may be closed by operation of either of the control handles 25 or 40 to energize the motor 12, if desired, to supply fluid through the control valves 24 and/or 34 for operation of the cylinders 26, 35 and 36 selectively; although, once the accumulator has been charged, the capacity of the pump 62 will be diverted as previously mentioned for such operation.

Once the accumulator 72 has been charged in the above manner, the steering portion of the system is assured of a substantial supply of pressure fluid for the steering of the vehicle as desired. In view of the fact that the steering control valve 78 is of the closed center type, as aforementioned, there will be no flow through the steering portion of the system until steering is actually required by movement of the operator's steering wheel from a neutral position. The accumulator 72 will supply the steering demand in the above manner until the pressure therein drops to the predetermined low setting of the differential pressure switch 92. As long as the motor 60 is in operation, during which time the vehicle is in motion, if the pressure should drop below such setting the pump 62 will continue to supply the high pressure fluid needed by the accumulator 72. If, on the other hand, the motor and vehicle are not in motion, and the pressure should drop below the predetermined low pressure setting of the pressure switch 92, the motor 12 will be automatically energized and the accumulator 72 will be provided with pressure fluid from the pumping element 30 of the dual pump unit 10 in the manner previously described.

When the vehicle is stationary or in motion and it is desired to operate the forks of the lift truck to engage and lift a load, the motor 12 may be energized by closing the ignition switch 13 and manipulating either of the control handles 25 or 40 to operate the dual pump unit 10 through the interlock switch connection 122 and either of the control valves 24 and 34 may be selectively operated as desired to cause raising and lowering movement of the forks by the lift motor 26 or tilting thereof by operation of the tilt motors 35 and 36 in any desired sequence.

Since the operation of the fluid motors 26, 35 and 36 is normally of an intermittent nature, the operation of the dual pump unit 10 by means of the motor 12 will not result in a serious battery capacity drain. Further, since the steering portion of the system does not rely upon the motor 12 for charging of the accumulator 72, except in very rare instances such as when the vehicle is stationary and steering is called for during an underpressure condition of the accumulator, utilization of battery power for such operation does not result in any serious battery capacity drain. In addition, very little torque is required to rotate steer pump 62 during those intervals when the truck is traveling and when the pump is neither charging the accumulator 72 nor directing its output into conduit 22 of the main hydraulic circuit, since, under such conditions, the discharge from the pump 62 is simply circulated back to the sump 18 at atmospheric pressure. Also, by providing the system with the one-way flow motor driven steer pump 62, power necessary for steering the truck is obtained at the cost of very little battery capacity since during a large part of the time of accumulator charging by the pump 62, the truck will be coasting with no expenditure of battery current.

The foregoing description of one embodiment of my invention has, for example, been directed to use thereof in a vehicle having electrical main motive power means 60 although it will be apparent to persons skilled in the art that the essentials of the system are readily applicable for use with internal combustion engines. In fact, one additional advantage of such use accrues in that the steer pump 62 would be available for charging the accumulator during periods of motor idling when the vehicle is stationary. In an electric motor drive of the type contemplated the motor does not run except to drive the vehicle. Also, the description of the above embodiment has been directed to use of the system in a lift truck type vehicle wherein motor means 26 is referred to as the load lifting motor, motor means 35, 36 as tilting motors for the mast, and motor means 74 as a steering motor. No doubt other uses for such motor means will be found, and I do not intend to be limited by such specified uses.

Referring now to the modification shown in FIG. 2, the same reference numerals as are used in FIG. 1 have been retained to identify elements which are common to both embodiments.

Inasmuch as the major portion of the modified system is similar both in structure and operation to the embodiment of FIG. 1, only the modified portion of FIG. 2 is described in detail below. Attention is directed to the foregoing detailed description of common elements in conjunction with FIG. 1, which when taken together with the following description will provide a detailed description of the modified system of FIG. 2.

As pointed out previously, in some electric motor driven industrial lift trucks, the prime mover may have insufficient output to run a steering motor pump without overloading. In such cases, the hydraulic system can be modified as shown in FIG. 2 by providing a steer pump 150 driven directly by a low output electric motor 152 which is operative whenever ignition switch 13 is closed. This separate steer pump and motor unit 150, 152 takes the place of the prime mover driven pump 62 of FIG. 1. The pump 150 is connected directly to the sump 18 by a conduit 154. The output of the pump 150 is directed to an unloading valve 156 by conduits 66 and 52. The unloading valve 156 is of known construction and contains a two-position spring loaded pilot operated spool valve, not shown, which in one position connects conduit 52 with the sump 18 by means of conduit 158 and in its other position connects conduit 52 with the accumulator and steering portions of the system. The spool valve is spring loaded to its second-mentioned position and is arranged to respond to accumulator pressure by way of conduit 159 such that when the accumulator pressure rises above a predetermined high limit, for example 1,500 p.s.i., the spool valve shifts to its first-mentioned position and when the accumulator pressure falls below a predetermined low limit, for example 1,400 p.s.i., the spool valve returns to its second-mentioned position. For example, an unloading valve having the above characteristics which is suitable for use in the system of the present invention is commercially available and is manufactured by Fluid Controls, Inc., Mentor, Ohio, under their Model No. 62004-8. The addition of unloading valve 156 makes unnecessary that portion of the hydraulic system of FIG. 1 which comprises conduit 56, check valve 58, solenoid valve 54 and conductors 140 and 142.

The dual pump unit 10 of FIG. 1 has been replaced by a single pump unit 160 which is driven by the pump motor 12 as before and which is connected to valves 24 and 34 by conduits 22 and 162, the latter conduit being connected to a high pressure carry-over port valve 164 in valve 24. The main drive motor 60 is connected to the battery 14 by conductors 166 and 168 and motor control 61, the motor 152 being connected in parallel with motor 60 by means of conductors 170 and 172.

Interlock switches 124 and 126, and conductors 128, 120, 132 and 138 of FIG. 1 are not required in the modified system of FIG. 2. Rather, the circuitry associated with switch 122 now includes a conductor 174 which connects the interlock switch 122 with the pressure switch 92, and a conductor 176 connecting two of the contact points of switch 122. With the interlock switch 122 positioned as shown in FIG. 2, closing the normally open differential pressure switch 92 energizes the motor 12 which in turn drives the pump 160. Since the pressure switch 92 is normally open, being set to close at the low limit of pressure necessary for steering, for example, 850 p.s.i., it is possible to actuate pump 160 to supply additional pressure fluid to accumulator 72 through conduits 22, 162, 48, 52 and 68, and the various valves interposed therein in any situation where pump 150 cannot meet the demands upon it.

Having now described the modified structure of the invention as embodied in FIG. 2, it is believed that a better understanding thereof may be had by describing same in conjunction with the operation of a lift truck vehicle.

Let it be assumed that a lift truck is in use and the ignition switch 13 is closed. Under this condition, regardless of whether the truck is stationary or in motion, the pump 150 will be running and will supply fluid under pressure to the accumulator 72 until the pressure therein reaches the high pressure setting thereof as set by the unloading valve 156. When such pressure is attained, the pressure fluid being delivered from the pump 150 will be returned to the sump 18 by means of conduit 158. Once the accumulator 72 has been charged in the above manner, the steering portion of the system is assured of a substantial supply of pressure fluid for the steering of the vehicle under normal operating conditions. However, under extraordinary conditions of operation in which the pump 150 cannot supply sufficient pressure fluid to maintain the minimum limit of pressure necessary for steering, the normally open pressure switch 92 closes, thereby actuating motor 12 which in turn drives pump 160, thus providing an auxiliary supply of pressure fluid to the accumulator 72.

It will also be appreciated that under the above conditions the motor 12 may be energized by manipulating either of the control handles 25 or 40 to operate the pump 160 through the interlock switch connection 122. Through such manipulation the control valves 24 and 34 may be selectively operated as desired to cause raising and lowering movement of the forks by the lift motor 26 or tilting thereof by operation of the tilt motors 35 and 36 in any desired sequence.

While the present invention has been described by way of reference to two illustrative embodiments thereof, various other changes in the construction and relative arrangement of parts than those above suggested may be made to suit requirements, and it is not intended that the invention should be limited otherwise than by the terms of the claims appended.

I claim:
1. A dual source hydraulic system for a vehicle comprising a reservoir for fluid, a plurality of accessory motors, a hydraulic steering motor, an accumulator for continuously supplying fluid under pressure to said steering motor, a first pump adapted to communicate with said reservoir, said accessory motors and said accumulator, a second pump adapted to communicate with said reservoir and with said accumulator, said second pump normally maintaining said accumulator in a charged condition, valve means responsive to accumulator pressure and adapted to alternatively direct fluid to said accumulator and to said reservoir in response to variations in accumulator pressure, and pressure responsive control means operatively connected to said accumulator to initiate operation of said first pump to charge said accumulator when the pressure in said accumulator reaches a predetermined low setting.

2. A dual source hydraulic system for a vehicle comprising a reservoir, a first pump, first conduit means connecting said first pump to said reservoir, an accumulator, a steering motor adapted to be driven by fluid under pressure from said accumulator, second conduit means connecting said first pump to said accumulator for charging said accumulator, valve means responsive to accumulator pressure and operable to alternately connect said second conduit to said accumulator and to said reservoir, a second pump, third conduit means for connecting said second pump to said reservoir, an accessory fluid motor, a control valve, fourth conduit means for connecting said second pump to said accessory fluid motor via said control valve, fifth conduit means connecting said second pump to said second conduit means upstream of said pressure responsive valve means via said control valve, and pressure responsive means operatively connected to said accumulator to initiate operation of said second pump to charge said accumulator when the pressure in said accumulator reaches a predetermined low value.

3. In a dual source hydraulic steering system for a vehicle, the combination of a sump, a first hydraulic pump, a motor for driving said first pump, a second hydraulic pump, another motor for driving said second pump, a steering motor for the vehicle to be connected to dirigible wheels thereof and to be controlled by an operator, an accumulator for supplying fluid to said steering motor from said first and second pumps for actuating said steering motor, first pressure responsive means operatively connected to said accumulator and to said first pump for directing the output of said first pump to said sump when the accumulator pressure rises above a predetermined pressure and second pressure responsive means operatively connected to said accumulator and to said second pump for initiating operation of said second pump to charge said accumulator when the pressure in said accumulator falls below a predetermined pressure.

4. In a dual source hydraulic steering system for a vehicle, the combination of a reservoir for fluid, first hydraulic pump means, operable continuously when the vehicle is in use, second hydraulic pump means operable intermittently when the vehicle is in use, operator controlled vehicle steering motor means operatively connected to said first and second pumps, pressure accumulator means operatively connected to said steering motor means and to said first and second pump means for supplying fluid from said pumps to said steering motor means, valve means operatively connected to said accumulator means for diverting the output of said first pump means from said accumulator means to said reservoir when accumulator pressure rises above a predetermined pressure, and pressure responsive control mean operatively connected to said accumulator means and to said second pump means for actuating said second pump means when accumulator pressure falls below a predetermined value.

5. In a dual source hydraulic steering system for a vehicle, the combination of a reservoir for fluid, first hydraulic pump means, operable continuously when the vehicle is in use, second hydraulic pump means operable intermittently when the vehicle is in use, operator controlled vehicle steering motor means, pressure accumulator means for supplying pressurized fluid to said steering motor means from said first and second pump means, and means operatively connected to said accumulator means for directing the flow of said first and/or second pump means toward said accumulator either to said reservoir or said accumulator means.

References Cited in the file of this patent
UNITED STATES PATENTS

| | | |
|---|---|---|
| 2,624,283 | Hirvonen | Jan. 6, 1953 |
| 2,674,092 | Gardiner | Apr. 6, 1954 |
| 2,674,854 | Church | Apr. 13, 1954 |
| 2,708,344 | Greer | May 17, 1955 |
| 2,875,843 | Price | Mar. 3, 1959 |
| 2,880,586 | Lincoln | Apr. 7, 1959 |
| 2,896,733 | Rockwell | July 28, 1959 |
| 2,923,130 | Wheelon | Feb. 2, 1960 |
| 2,945,352 | Stelzer | July 19, 1960 |
| 2,954,671 | Kress | Oct. 4, 1960 |